United States Patent Office 3,243,380
Patented Mar. 29, 1966

3,243,380
DECONTAMINATION OF ORGANIC
MODERATOR-COOLANTS
Mervin E. Conn, Westfield, N.J., assignor, by mesne assignments, to the United States of America as represented by the United States Atomic Energy Commission
No Drawing. Filed Apr. 12, 1963, Ser. No. 272,812
15 Claims. (Cl. 252—301.1)

This invention relates to a method of decontaminating sulfur-containing organic liquid moderator-coolants used in a nuclear reactor and exposed to radiation which converts sulfur constituents to radioactive dangerous materials that contain $S^{35}$ and $P^{32}$.

The present invention has particular application to the use of low cost fractions of petroleum having suitable chemical structure for resistance to pyrolytic and radiolytic degradation but which tend to contain sulfur in appreciable small amounts, e.g. about 0.01 to 1 wt. percent or more.

More particularly, the present invention is concerned with removal and sequestering of the radioactive substances from organic liquids by a method which is effective at such temperatures as maintain a suitable heat relationship for circulation of the liquid, its purification, and reuse as a moderator-coolant with low loss of desired material and of energy, safety in accomplishing the separation, and concentration of the separated radioactive substances for economical and safe disposal.

It is desirable to minimize expensive storage containers for the radioactive substances separated.

In the operation of nuclear reactors, the natural sulfur, consisting of nonradioactive isotopes $S^{32}$ to the extent of about 95.1 wt. percent, $S^{34}$ to the extent of about 4.2 wt. percent, and lesser amounts of $S^{33}$ and $S^{36}$, is exposed to the neutron flux emanating from the nuclear fuel transformations in the reactor core. As a result of exposure to the neutron flux, the $S^{34}$ isotope is converted to the radioactive $S^{35}$ nuclide and the $S^{32}$ isotope is converted to $P^{32}$, which is also radioactive. Both of these atomic conversions result in the release of considerable energy, having a recoil effect sufficient to change the chemical bonding of the transformed atoms. In the case of ring-bound sulfur, such as thiophenic sulfur, it is probable that the $S^{35}$ and $P^{32}$ formed therefrom are no longer chemically bonded as in the original molecule, are less likely to be ring-bound, and are probably easier to remove from the coolant than the original molecule.

The solid adsorbents useful for adsorption of the radioactive $S^{35}$ and $P^{32}$-containing substances fall into several categories, but have mainly in common the property of being hydrogenation catalysts or catalyst promoters, as, for example: The metals of Groups VIII, IB, II, IV and VIB of the Periodic Chart of Elements ("Handbook of Chemistry and Physics," 40th ed., pages 448 and 449), their partially reduced oxides, and oxides which are difficult to reduce. For example, the Group VIII transition metals, nickel, cobalt and iron, and their reduced oxides, are very effective. Also very effective are metals of Group IB, preferably silver, copper, and their reduced oxides, and the oxides of metals in Group II, such as MgO, ZnO, and CaO, particularly ZnO. The metals and their oxides in Group IV are preferably used as promoters, as are the oxides of metals in Group VIB, such as chromia, molybdena, and tungsten oxide, which are used preferably in combination with mixed metal oxide compounds, e.g. cobalt molybdate, zinc chromite, and copper chromite.

In addition, the hydrogenation catalysts/promoters can be extended to include alumina, MnO, and others of the alkaline earth oxides, such as BaO, and SrO.

The active metal and metal oxides of the hydrogenation catalyst type are preferably to be used when supported on a microporous high-surface base material, e.g. activated gels of alumina-silica, silica-aluminas, and aluminosilicates, as in clays and zeolites.

The more active catalytic metals and oxides are more suitable at moderate temperatures, such as 400° to 700° F., while the less active metals and oxides exhibit a better response at higher heating temperatures, e.g. in the range of 600° to 800° F.

The selectivity and the selectivity-temperature characteristics of the adsorbent are also important. Selective removal of $S^{35}$ and $P^{32}$ constituents in preference to removal of unconverted natural sulfur in the coolant avoids useless depletion of the adsorbent, extends its useful life, and increases the effectiveness and efficiency of the treating process. Furthermore, adsorbents should be both selective and active in the temperature range, i.e. 400° to 800° F., normally prevailing for organic coolants in nuclear power plants.

The activity and selectivity of the adsorbents for the present purposes can be evaluated in terms of percent removal of the radioactive sulfur and phosphorous contaminants and the total nonradioactive sulfur at a given treat (weight of contaminated liquid treated per weight of adsorbent solids).

Suitable inexpensive organic moderator-coolant liquids are obtained by extracting aromatic hydrocarbons from a distillate formed in catalytically cracking or other suitable processing of a petroleum gas oil, the distillate and the extract boiling in the range of 600° to 900° F. principally. To reduce the sulfur content of the petroleum gas oil, the distillate which is extracted, or the extracted hydrocarbons, to low levels is expensive. For example, 5-pass hydrofining of a catalytically cracked cycle stock extract at conditions to remove sulfur, but to avoid substantial hydrogenation of the aromatic hydrocarbons, reduced the sulfur content to only 140 parts per million. Even so, this much sulfur creates a problem in connection with the disposal of the radioactive degradation polymer, frequently referred to as "high boilers." These, formed by radiolysis of the coolant hydrocarbons, must be removed to avoid excessive accumulation of polymers in the circulating coolant stream. The presence of the radioactive $S^{35}$ and $P^{32}$ constituents in the polymer creates the above-mentioned disposal problem and the greater the concentration of these radionuclides in the coolant, the greater is the polymer disposal problem. Furthermore, the concentrations of $S^{35}$ and $P^{32}$ increase with increasing sulfur content of the coolant charged to the system. Even substantially pure hydrocarbons, such as the terphenyls in their conventional commercial forms, contain appreciable amounts of sulfur, e.g. 40 to 60 parts per million, and even this much sulfur results in a significant degree of $S^{35}$ and $P^{32}$ contamination so as to present a disposal problem for the degradation polymers.

Additional thermal treatment of aromatic extracts from petroleum, as, for example, the highly refined extract of 140 parts per million of sulfur, can be carried out to improve stability toward polymer formation during use as a coolant in nuclear power plants. Thermal treatment in the petroleum refinery consists of heat soaking the coolant at a temperature of 600° to 900° F. for a period of time, such as 12 to 70 hours, to decompose unstable compounds with evolution of gaseous hydrocarbons and formation of higher boiling polymers that are removed to stabilize the oil.

When the liquid aromatic hydrocarbons of suitable boiling range and even best stability are used as moderator-coolants in a nuclear reactor, high boiling polymeric materials and low molecular weight gases are produced by the thermal and radiation effects, and this requires that all or part of the circulating coolant be processed to remove the polymer so as to prevent formation of a coating on the pipes and walls of the reactor, particularly the heat transfer surfaces, contacted by the liquid coolant. Usually, a side stream of the circulating coolant is processed to separate the polymer, e.g. by distillation or by precipitation of the polymer from solution in a low boiling paraffin, e.g. n-hexane, at low enough temperatures and with sufficient pressure to maintain liquid phase. The precipitation of the polymer may be followed by filtration, and stripping or distillation of the filtrate to recover the polymer-free aromatic oil which is to be returned to the reactor. Sufficient fresh moderator-coolant liquid is added to make up for the material removed, as gas and polymer.

The full stream, a side stream part of the full stream of the coolant from the reactor, or the polymer separated from said streams can be treated by the adsorbents for removal of the radioactive $S^{35}$ and $P^{32}$ constituents. This treatment, which concentrates the radioactive constituents on the adsorbent, as well as to remove them from the polymers, may be described as a decontamination process.

For the evaluation of the adsorbent treating agents, liquid terphenyl mixtures which may contain a minor amount of biphenyl, such as is present in commercial terphenyl products, were used with determined amounts of dibenzothiophene admixed. Dibenzothiophene is of the same general volatility level as the terphenyls and contains sulfur which is resistant toward removal by convention refining techniques. The solutions were irradiated in a nuclear pile and diluted with more terphenyls to provide suitable concentrations of total S, $S^{35}$ and $P^{32}$.

The adsorbent treating agents usually were ground and screened to 100 to 200 mesh, heated to a certain temperature level, usually 450° to 500° F., to remove moisture. Some were subjected to reduction with $H_2$ at 500° to 1200° F.

The evaluation and screening tests have the purpose of determining which adsorbents serve best and are most practical for the selective removal of the radioactive substances. Selective removal of these substances is preferred so that the adsorbents can be used to treat larger quantities of the organic coolant and can be used to avoid removal of beneficial substances, e.g. sulfur, which can be present as a polymerization inhibitor.

Various methods of contacting the coolants to be decontaminated by the adsorbents were used in the tests, such as percolation of the liquid through beds of adsorbent of predetermined volume and weight, and slurrying predetermined proportions of the adsorbent in the liquid.

The organic liquid coolants to be used in nuclear reactors may have various compositions. For example, some have been mixtures of biphenyls with terphenyls boiling in the range of 520° to 650° F.; some have been mixtures of mainly terphenyl isomers boiling in the range of about 600° to 725° F.; others could be mixtures of alkyl polyphenyls, mixtures containing polynuclear aromatics, or mixtures containing some partially hydrogenated aromatics. The presently preferred aromatic hydrocarbon liquids boil in the range of 600° to 900° F., and the high boilers or polymers that are to be removed to prevent undesired coating effects and excessive viscosity-induced pumping costs boil above 900° F. However, as much as up to 30% high boilers in the coolant may be tolerated.

Tests to evaluate the adsorbents and demonstrate the invention are described in the following examples:

EXAMPLE 1

A stainless steel reactor to hold one to several grams of powdered adsorbent was used with other required equipment for flow tests at w./w. (weight of liquid/weight of adsorbent) treats up to 1000:1, and temperatures up to 800° F. One run was completed using as adsorbent a powdered commercial hydrogenation catalyst of 70% Ni as the reduced oxide on kieselguhr. The liquid feed to be decontaminated, a neutron irradiated solution of dibenzothiophene in terphenyls, was passed through the adsorbent at 695° F. under 103 p.s.i.g. pressure. Samples covering the range from 5 to 1000 w./w. were analyzed for $S^{35}$, $P^{32}$ and total nonradioactive sulfur. Representative results from this test were combined (1) with results on the same adsorbent from percolation tests in glass tubes to be described hereinafter, and (2) with results from contacting the same adsorbent by stirring it together with irradiated dibenzothiophene feed solution in a glass resin flask for 2 hours at 600° F. and atmospheric pressure. All of these results are summarized in the following tabulation:

Table I

DECONTAMINATION OF TERPHENYL SOLUTIONS BY POWDERED 70% Ni ON KIESELGUHR

| Percolation Type Operation w./w. Percent Removed [2] | One-Pass | | | Two-Pass [1] 500 |
|---|---|---|---|---|
| | 100 | 500 | 1,000 | |
| $S^{35}$ | 85 | 73 | 67 | 89 |
| $P^{32}$ | 91 | 80 | 74 | 93 |
| Total Sulfur | 22 | 11 | 10 | 19 |

[1] On the basis of one pass at 1,000 w./w. followed by a second pass through the same quantity of the solid adsorbent at 1,000 w./w. under the same conditions.
[2] Based on the total average product from 0 to the final w./w. tabulated.

The data in Table I demonstrate the feasibility of removing $S^{35}$ and $P^{32}$ in preference to the nonradioactive thiophenic sulfur (i.e. total S) which is present in higher concentration. Almost 90% of the radioactive contaminants are removed, while only 22% of the nonradioactive S is removed in a one-pass operation at 100 w./w. Two-pass operation is indicated to be substantially more effective than one-pass operation.

It is also apparent from the data of Table I that the adsorbent was far from spent, even after treating 1000 weights of liquid per weight of adsorbent. The instantaneous percent removal values at 1000 w./w. and 695° F. were 57% for $S^{35}$, 64% for $P^{32}$ and about 8% for nonradioactive sulfur. A countercurrent multiple stage contacting system in fixed beds, in fluidized beds or in stirred vessels, is a preferred process arrangement. Recycle of the polymers, removed by distillation or by other means, to the feed to the treating process may be employed to advantage.

EXAMPLE 2

Percolation screening tests were carried out on a large number of adsorbents to find the most selective and active materials and the most suitable supports.

For these tests, the ground adsorbent treating agents, freed of excessive moisture and reduced with $H_2$ gas in some cases, were weighed and packed in glass tubes.

The adsorbent beds were about 1.4 cm. diameter by 15 cm. deep and were supported by glass wool plugs, and a column of glass beads above the adsorbent bed served as a preheater section. The tubes were surrounded by a heater to provide and maintain a uniform test temperature. Weighed amounts of the liquid to be treated were percolated down through the beds under atmospheric pressure into receivers in which the treated products were weighed, mixed and sampled for analysis. Nitrogen blanketing was provided at inlets and outlets of the tubes when necessary to minimize oxidation of the reduced metal oxide adsorbents.

The test data for a variety of powdered materials are presented in Table II. A definite favorable effect of surface area of the adsorbent agents on decontamination activity was found, as evidenced by increasing percent $S^{35}$ and $P^{32}$ removal values with increasing surface area and with decreasing values of the parameter: grams of liquid treated per gram of adsorbent (w./w.) divided by the surface area per gram of the fresh adsorbent. This parameter is used to define the treat in terms of liquid treated per unit surface area of adsorbent. The most effective materials are Ni, Cu, ZnO, and Ag supported on kieselguhr or alumina.

Combination adsorbents, e.g. a hydrogenation catalyst metal oxide, such as $Ag_2O$, on a high surface area support, such as alumina, in the upper part of the bed and soda-lime in the lower half of the bed, are also indicated to be among the outstanding adsorbents. For top performance, all active metal or metal oxide ingredients should be supported on a high surface area alumina or silica-alumina gel. The alumina and alumina-silica supports were found superior to activated carbon and straight silica gel, and are the preferred supports, especially when using relatively small amounts, e.g. about 11% of an active ingredient, such as Cu or Ni obtained from their reduced oxides. In general, the supported oxides can be prepared by impregnation of the support with a water solution of a suitable salt of the metal and then heating the impregnated gel in air.

The superior adsorbents had surface areas in the range of about 50 to 300 square meters per gram, and all of the data indicate that this property should be maximized. Turning now to active ingredient concentrations, it may be noted that 11% Ni on alumina made an adsorbent almost as good as 70% Ni on kieselguhr. Similarly, 11% Cu on alumina was almost as good as 55% Cu on kieselguhr. This indicates that it is not necessary to have a high metal content and that the active metal content may be in the range of about 10 to 80%. Nickel oxide (NiO) adsorbents are greatly improved by reduction with $H_2$ gas before testing. On the other hand, the readily reducible metal oxides, CuO and $Ag_2O$, are reduced in the test and, therefore, give the same results as the same adsorbents reduced by $H_2$ prior to the test.

The pattern for removal of radioactive $P^{32}$-containing substances is similar to that for the removal of $S^{35}$-containing substances, except that the $P^{32}$ substances are generally much easier to remove than the $S^{35}$ constituents. In this connection, it may be noted that 12 of the adsorbents tested removed 98% or more of the $P^{32}$ constituents. Included among these 12 are those described above as also outstanding with regard to removal of $S^{35}$.

Others in this group of 12, although not outstanding with regard to $S^{35}$ removal, are still quite active and remove the bulk of $S^{35}$ constituents. These include reduced Porocel (73% $Al_2O_3$, 16% $Fe_2O_3$, $SiO_2$, $TiO_2$), used cracking catalyst ($SiO_2/Al_2O_3$ plus impurities), Attapulgus clay (68% $SiO_2$, $Al_2O_3$, MgO, $Fe_2O_3$), 0.6% Pt on alumina hydroforming catalyst, reduced $CoMoO_4/Al_2O_3$ hydrodesulfurization catalyst, and $ZnCr_2O_4$ catalyst. The results for the 0.6% Pt composition indicate that very low metal contents can be employed to make an active adsorbent. This widens the range of effective metal content to 0.3 to 80%. Reduced Porocel, Attapulgus clay (which would probably also be improved by $H_2$ reduction), and used cracking catalyst may be considered as support materials containing some active ingredients incidentally present. These microporous materials could be impregnated with Ni or Cu, to improve their $S^{35}$-removing ability and to make outstanding decontaminating agents.

Data on the percent total sulfur (nonradioactive) removed were also obtained. In nearly all instances, the adsorbents capable of removing satisfactory amounts of $S^{35}$ and $P^{32}$ remove only a small portion of the total sulfur, i.e. 1 to 8%. The high Ni-containing adsorbent removes 51% of the total sulfur in this test. However, when extended treats (i.e. 100 to 1000 w./w.) in the commercial range are employed with this adsorbent, as described in Example 1 above, only 10 to 22% of the total sulfur is removed. Returning now to the data from this test found in Table II, it is indicated that lowering the metal content tends to increase selectivity (i.e. high $S^{35}$ and high $P^{32}$ with low total S removal). Also, Cu tends to be slightly more selective than Ni. Considering all of the data, it has been amply demonstrated that selective removal of the radioactive contaminants present in very low concentrations by suitable adsorbents is feasible.

Active hydrogenation catalysts and decontamination agents may be prepared by methods other than those described and tested. Raney nickel and other Raney metal catalysts, in particular, are such materials.

*Table II*

COMPARATIVE RESULTS FROM PERCOLATION SCREENING TESTS AT 460° F., 1 ATM., ON DECONTAMINATING A TERPHENYL COOLANT CONTAINING $S^{35}$ AND $P^{32}$ FROM IRRADIATED DIBENZOTHIOPHENE IN MIXTURE

| | Adsorbent Type and Composition | Surface m.²/g. | Final w./w. | w./w. ÷ m.²/g. | Percent Removed From Composite Product Collected Between 5 and 10 V/V | | |
|---|---|---|---|---|---|---|---|
| | | | | | $S^{35}$ | $P^{32}$ | Sulfur |
| 1 | Solid Glass Spheres (6 mm. o.d.) | <10⁻³ | 8.5 | >8×10³ | 9 | 10 | |
| 2 | Diatomaceous Earth, $SiO^2$ | 0.4 | 25.4 | 64 | 13 | 22 | |
| 3 | Commercial Silica Gel | 588 | 16.3 | 0.028 | 30 | 82 | |
| 4 | Activated C (commercial Liquid Phase) | 711 | 22.0 | 0.031 | 42 | 86 | |
| 5 | Dehydrog. Cat. (90% $Fe_2O_3$, $Cr_2O_3$, $K_2CO_3$) | 2 | 8.1 | 4.0 | 37 | 46 | |
| 6 | Above, Reduced $H_2$ at 1,200° F | (2) | 9.5 | ~4.8 | 51 | 43 | |
| 7 | Porocel (73% $Al_2O_3$, 16% $Fe_2O_3$, $SiO_2$, $TiO_2$) | 195 | 12.4 | 0.064 | 43 | 86 | |
| 8 | Above, Reduced $H_2$ at 900° F | (195) | 12.5 | 0.064 | 70 | 99 | |
| 9 | Fresh Cracking Cat. (87% $SiO_2$, $Al_2O_3$) | 638 | 22.6 | 0.035 | 47 | 94 | |
| 10 | Commercial $Al_2O_3$ Gel (95% $Al_2O_3$, $SiO_2$) | 364 | 14.6 | 0.040 | 49 | 92 | |
| 11 | Hydrog. Cat. ($CuCr_2O_4$, Promoted by Ba) | 45 | 7.3 | 0.16 | 48 | 57 | |
| 12 | Above, Reduced $H_2$ at 1,200° F | (45) | 7.1 | 0.16 | 72 | 71 | |
| 13 | Soda-Lime (90% $Ca(OH)_2$, NaOH) | <1 | 12.0 | >12 | 47 | 54 | |
| 14 | Used Cracking Cat. ($SiO_2$, $Al_2O_3$ plus V, Ni, Cu) | 147 | 15.0 | 0.10 | 52 | 98 | |
| 15 | Attapulgus Clay (68% $SiO_2$, $Al_2O_3$, MgO, $Fe_2O_3$) | 124 | 17.0 | 0.14 | 58 | 98 | |
| 16 | Exper. Cat. (19% $MnO_2$ on $Al_2O_3$), Reduced $H_2$ at 600° F | 72 | 9.8 | 0.14 | 62 | 92 | ~0 |
| 17 | Hydroform. Cat. (0.6% Pt on $Al_2O_3$) | 190 | 12.0 | 0.063 | 69 | >99 | |
| 18 | Hydrofining Cat. ($CoMo_4/Al_2O_3$) | 300 | 16.9 | 0.056 | 80 | >99 | |
| 19 | Methanol Syn. Cat. ($ZnCr_2O_4$) | 116 | 7.0 | 0.060 | 80 | 98 | |
| 20 | Ag Cat.— 20% Ag as $Ag_2O$ on $Al_2O_3$ | 51 | 9.5 | 0.19 | 72 | 94 | ~0 |
| 21 | Ag Cat.— Above, Reduced $H_2$ at 500° F | (51) | 9.8 | 0.19 | 71 | 93 | ~0 |
| 22 | Ag Cat.— 50% of 20 Above plus 50% Soda-Lime | 26 | 9.7 | 0.37 | 78 | 98 | ~0 |
| 23 | Desulf. Cat. (24% ZnO on $Al_2O_3$) | 46 | 8.2 | 0.18 | 78 | 96 | ~0 |
| 24 | Cu Cat.—55% Cu on Kieselguhr, Reduced | 17 | 11.4 | 0.67 | 77 | 93 | ~6 |
| 25 | Cu Cat.—11% Cu as CuO on $Al_2O_3$ | 220 | 9.5 | 0.043 | 89 | >99 | ~0 |
| 26 | Cu Cat.—Above, Reduced $H_2$ at 600° F | (220) | 10.3 | 0.047 | 89 | >99 | ~1 |
| 27 | Ni Cat.—Powdered Metal (NiO coated) | (6×10⁻³) | 2.3 | ~400 | 25 | 23 | |
| 28 | Ni Cat.—11% Ni as NiO on $Al_2O_3$ | 167 | 10.2 | 0.061 | 68 | 97 | |
| 29 | Ni Cat.—Above, Reduced $H_2$ at 750° F. or 1,200° F | (167) | 11.5 | 0.069 | 86 | >99 | ~8 |
| 30 | Ni Cat.— 70% Ni on Keiselguhr, Reduced | 79 | 7.6 | 0.096 | 91 | 99 | 51 |

From various tests at different temperature levels and ratios of contact, it was noted that the amount of removal may be increased with increased temperatures, e.g. in the range of 400° to 800° F. Increasing the contact ratio from 1 to 1000 w./w. resulted in a gradual decline in removal, but even after 1000 w./w., the adsorbent was still quite active. In general, removal appears to take place by a chemisorption mechanism.

Since high boiling or polymeric compounds are formed from aromatic hydrocarbons by radiolysis in the reactor core of nuclear power plants, it is necessary to remove portions of these boilers by flash distillation in a purification loop. The high boilers, which are obtained as bottoms from flash distillation, may be stored for a period of time to reduce radioactivity by decay before they are disposed of by combustion. The degree of this disposal problem depends on the high boiler concentrations of $S^{35}$ and $P^{32}$, which in turn depend on these concentrations in the circulating coolant, which in turn depend on the concentration of natural (nonradioactive) sulfur in the coolant charged to the system. Hence, the treating process described above can be employed in two ways— namely, (1) to reduce disposal time, equipment and costs for a given sulfur content fresh coolant, and/or (2) to allow a coolant of increased sulfur content to be used with a given high boiler disposal system. The second option appears the more attractive and can be exercized in one or more of the following ways: (a) add a suitable sulfur-containing inhibitor to the coolant to minimize high boiler formation and coolant makeup costs; (b) permit a relaxation in the sulfur specifications for commercial terphenyl mixtures and, hence, reduce coolant costs; and/or (c) permit relatively high sulfur, low cost petroleum refinery streams to be used with attendant savings in coolant costs.

The present invention is based on the discovery of solid adsorbent materials that adsorb and react with the radioactive substances which contain $S^{35}$ and $P^{32}$ in the moderator-coolant hydrocarbon liquids to facilitate nearly complete removal of such substances, even if they are present in very low proportions and do so without interfering with the circulation and reuse of the liquids.

What is claimed is:

1. Method of decontaminating an aromatic hydrocarbon liquid moderator-coolant for a nuclear reactor by selective removal of radioactive $S^{35}$ and $P^{32}$ substances therefrom, which comprises percolating the aromatic liquid contaminated by said substances through a bed of finely-divided adsorbent of a metallic hydrogenation catalyst of the group consisting of Cu, Ag, Zn, Ti, V, Cr, Mo, W, Fe, Co, Ni, and Pt on a porous carrier at a temperature in the range of about 400° to 800° F. at a suitable liquid to solid ratio to obtain substantial selective adsorption of the radioactive substances by the adsorbent, and recovering the aromatic liquid freed of the radioactive substances selectively adsorbed by the adsorbent.

2. The method of decontaminating an aromatic hydrocarbon liquid moderator-coolant for a nuclear reaction, which comprises contacting a portion of the aromatic liquid-containing, high boiling polymers and radioactive $S^{35}$ and $P^{32}$-containing substances with a finely-divided adsorbent containing a hydrogenation catalyst of the group consisting of Cu, Ag, Ca, Ba, Zn, Ti, V, Cr, Mo, W, Fe, Co, Ni and Pt in elementary and oxide form, the Ba and the Ca being present in the oxide form as promoters with a reduced metal oxide of the group, and mixtures thereof, and separating the liquid with the polymers from the adsorbent and radioactive substances adsorbed therein.

3. The method of claim 2, in which the aromatic liquid boils mainly in the range of about 600° to 900° F. and contains nonradioactive thiophenic compounds which boil in said range and higher boiling hydrocarbons formed by radiolysis.

4. The method of claim 2, in which the adsorbent contains Ni on kieselguhr.

5. The method of claim 2, in which the adsorbent contains Cu on alumina.

6. The method of claim 2, in which the adsorbent is $Ag_2O$ on alumina.

7. The method of claim 2, in which the adsorbent contains ZnO.

8. The method of claim 2, in which the adsorbent contains a Group VIII iron family metal on a microporous oxide carrier.

9. The method of claim 2, in which the adsorbent contains a reduced metal oxide hydrogenation catalyst on a microphorous oxide carrier.

10. The method of claim 2, in which the adsorbent is a calcined metal oxide hydrogenation catalyst on a microporous oxide carrier.

11. The method of claim 2, in which the liquid containing the polymer and radioactive substances is passed into contact with a second quantity of adsorbent for additional removal of radioactive substances.

12. A method of decontaminating an aromatic hydrocarbon liquid moderator-coolant exposed to neutron flux which converts a portion of the thiophenic compounds in the liquid to radioactive $S^{35}$ and $P^{32}$-containing substances, which comprises removing said radioactive substances selectively by contacting the moderator-coolant with an inorganic adsorbent which contains a reduced metal oxide hydrogenation catalyst in elementary form selected from the reduced oxides of Ni, Co, Fe, Cu, and Ag on a porous metal oxide carrier at a temperature in the range of about 400° to 800° F., and separating the aromatic hydrocarbon liquid containing unadsorbed nonradioactive thiophenic compounds from the adsorbent which holds the radioactive substances adsorbed thereon.

13. Method of decontaminating a liquid organic moderator-coolant contaminated by radioactive $S^{35}$ and $P^{32}$-containing contaminants, which comprises contacting the contaminated moderator-coolant with an inorganic adsorbent that contains a metal of the group consisting of Cu, Ag, Zn, Ti, V, Cr, Mo, W, Fe, Co, Ni, and Pt in elementary and oxide form, and mixtures thereof, which give the adsorbent catalytic hydrogenating activity, and recovering the resulting decontaminated moderator-coolant separated from the adsorbent and from said radioactive contaminants selectively adsorbed by the adsorbent.

14. Method of claim 13, in which the adsorbent contains the metal supported on a porous oxide carrier of the group consisting of alumina, silica, magnesia, silica-alumina, and mixtures thereof.

15. Method of claim 13 in which the adsorbent contains the metal in finely divided form supported on a calcined porous carrier.

References Cited by the Examiner

UNITED STATES PATENTS

| 3,135,665 | 6/1964 | Koutz et al. | 176—37 X |
| 3,141,829 | 7/1964 | Fortesque et al. | 176—37 X |
| 3,161,599 | 12/1964 | Black | 176—37 X |

OTHER REFERENCES

Milenkovic et al.: "Separation of $S^{35}$, $P^{32}$, and $Cl^{36}$ on Alumina," October 1961, Nuclear Science Abstracts, vol. 16, item 14822 on page 1913.

Berkman et al.: Catalysis, Reinhold Publishing Corp., New York, 1940, pages 822 and 831.

(Other references on following page)

Veljkovic et al.: Concentration of Carrier-Free Radioisotopes by Adsorption of Alumina, Nuclear Science Abstracts, vol. 13, 1959, item 6436 on page 851.

Kar et al.: Concentration of Radioactive Phosphorus, p. 32 in the Carrier-Free State by Adsorption On Ignited Barium Sulphate, Nuclear Science Abstracts, vol. 15, 1961, item 12977 on page 1664.

G.E. Nuclear Science Abstracts, vol. 14, 1960, item 18734 on page 2403.

LEON D. ROSDOL, *Primary Examiner.*

M. O. WOLK, CARL D. QUARFORTH, *Examiners.*

M. E. ROGERS, L. DEWAYNE RUTLEDGE,
*Assistant Examiners.*